United States Patent [19]

Chevereau

[11] Patent Number: 5,263,069
[45] Date of Patent: Nov. 16, 1993

[54] PRESSURIZED WATER REACTOR WITH SOLID PARTITIONING

[75] Inventor: Gérard Chevereau, La Raincy, France

[73] Assignee: Framatome, Courbevoie, France

[21] Appl. No.: 800,030

[22] Filed: Nov. 29, 1991

[30] Foreign Application Priority Data

Nov. 30, 1990 [FR] France .................. 90 15051

[51] Int. Cl.$^5$ ............................................. G21C 11/06
[52] U.S. Cl. ..................................... 376/400; 376/459
[58] Field of Search ............... 376/433, 459, 377, 389, 376/390, 399, 400, 302, 304; 370/427

[56] References Cited

U.S. PATENT DOCUMENTS

| 3,133,000 | 5/1964 | Hartnell-Beavis | 376/400 |
|---|---|---|---|
| 3,238,106 | 3/1966 | Long et al. | 376/427 |
| 3,252,868 | 5/1966 | Perilhou et al. | 176/67 |
| 4,158,605 | 6/1979 | Cooper, Jr. et al. | 376/400 |
| 4,543,232 | 10/1985 | Elter et al. | 376/458 |
| 4,569,820 | 2/1986 | Fortescue | 376/427 |
| 4,675,152 | 6/1987 | Verdeau et al. | 376/400 |
| 4,704,248 | 11/1987 | Lee et al. | 376/427 |
| 4,751,043 | 6/1988 | Freeman et al. | 376/400 |
| 4,925,624 | 5/1990 | Chevereau et al. | 376/400 |

FOREIGN PATENT DOCUMENTS 0323306 7/1989 European Pat. Off. .

*Primary Examiner*—Donald P. Walsh
*Assistant Examiner*—Frederick H. Voss
*Attorney, Agent, or Firm*—Pollock, Vande Sande & Priddy

[57] ABSTRACT

A pressurized water reactor has a solid reflector formed of a stack of rings each completely surrounding the reactor core, whose internal periphery matches the external contour of the core. Keys fixed to the casing project into vertical grooves formed in the rings for centering them with respect to the core casing. The stack is formed with a plurality of vertical channels each consisting of a plurality of vertical mutually aligned passages each formed in a respective one of said rings, each channel containing a plurality of vertically aligned plugs.

The vertical passages are formed in radially thicker parts only of the rings. Each plug cooperates with the respective ring to define an annular water flow channel. Some at least of the plugs comprise an upper flange bearing on a shoulder of a corresponding ring, machined for defining channels slanted with respect to the vertical so as to give a circumferential speed component to the water flowing along the annular passages about the plugs.

6 Claims, 2 Drawing Sheets

PRESSURIZED WATER REACTOR WITH SOLID PARTITIONING

BACKGROUND OF THE INVENTION

The present invention relates to pressurized water reactors of the type comprising a core, formed of prismatic shaped assemblies disposed side by side in a cylindrical core casing having a vertical axis, forming between the core and the casing a space in which a solid partitioning is disposed.

It relates more particularly to reactors of the type in which the solid partioning is formed by a vertical stack of rings surrounding the core, whose external periphery is engaged with a clearance in the casing and whose internal periphery matches the external contour of the core, said rings being centered with respect to the core casing by keys fixed on the casing and projecting into vertical grooves of the rings and being formed with vertical mutually aligned holes defining cooling channels containing plugs leaving restricted flow passages.

In such a reactor, the flow of cooling water is improved as compared to those previously known. In particular, the use of narrow annular flow passages reduces the volume of water in the partitioning for a given cooling efficiency and increases the neutron reflecting action.

In the partitioning described for example in French patent No. 87 17923 (or the corresponding U.S. Pat. No. 4,925,624 to Chevereau et al), a pressure balancing chamber is formed between two successive plugs and communicates the annular passages around the plugs. This chamber must have a low height, so as not to represent a significant water volume reducing the reflecting power. Consequently, temperature homogenization does not occur. Now, gamma absorption, and so heat dissipation per unit volume in the partitioning, is at a maximum close to the frontier between the partitioning and the core and then rapidly decreases in the outward radial direction. Insufficient mixing of the fluid streams in the annular water layer leads to water and partioning heating which is much higher in the zones closest to the frontier.

So that the maximum temperature of the partitioning in these zones remains acceptable, a high cooling flow rate is required. This requires pump oversizing and results in a danger of decreasing the flow rate in the peripheral assemblies of the core.

SUMMARY OF THE INVENTION

It is an object of the invention to provide a reactor of the above defined type whose partitioning has a cooling circuit which, for a given water flow rate and water volume in the partitioning, reduces the maximum temperature and the temperature differential.

To this end, there is provided a reactor in which some at least of the plugs comprise a flange bearing on a shoulder of a respective ring, machined so as to define channels slanted with respect to the vertical so as to give a circumferential speed component to the water flowing along the annular passages. The channels are advantageously formed between helical or at least oblique teeth.

Thus, in the successive annular passages, the water takes on a helical movement which causes the water streams to pass successively into zones with high heat generation and into zones with low heat generation. Thus, the temperature differences, so the differential heat expansion and the differential swelling under neutron irradiation (such swelling depending on the temperature) are reduced. Consequently, deformation of the rings is reduced.

The invention is particularly suitable for improving the partitioning of a pressurized water reactor as defined and claimed in U.S. Pat. No. 4,925,624, having a core formed by fuel assemblies of prismatic shape disposed side by side inside a cylindrical casing having a vertical axis; a solid partitioning located in a space reserved between the core and the casing, the partitioning being formed as a vertical stack of rings each completely surrounding the core, whose external periphery is received in the casing and separated therefrom by a clearance and whose internal periphery matches the external contour of the core; and keying means fixed to the casing and projecting into vertical grooves formed in the rings for centering said rings with respect to the core casing, wherein said stack is formed with a plurality of vertical channels each consisting of a plurality of vertical mutually aligned passages each formed in a respective one of said rings, each channel containing a plurality of vertically aligned plugs and each of said plugs being individually supported by a respective one of said rings, being centered in the passage in the respective ring and defining therewith a restricted water flow passage, some at least of said plugs projecting upwardly above the respective ring into a cavity of the ring placed above said respective ring.

The invention will be better understood from the following description of a particular embodiment, given by way of non limitative example.

DETAILED DESCRIPTION

Figure 1:
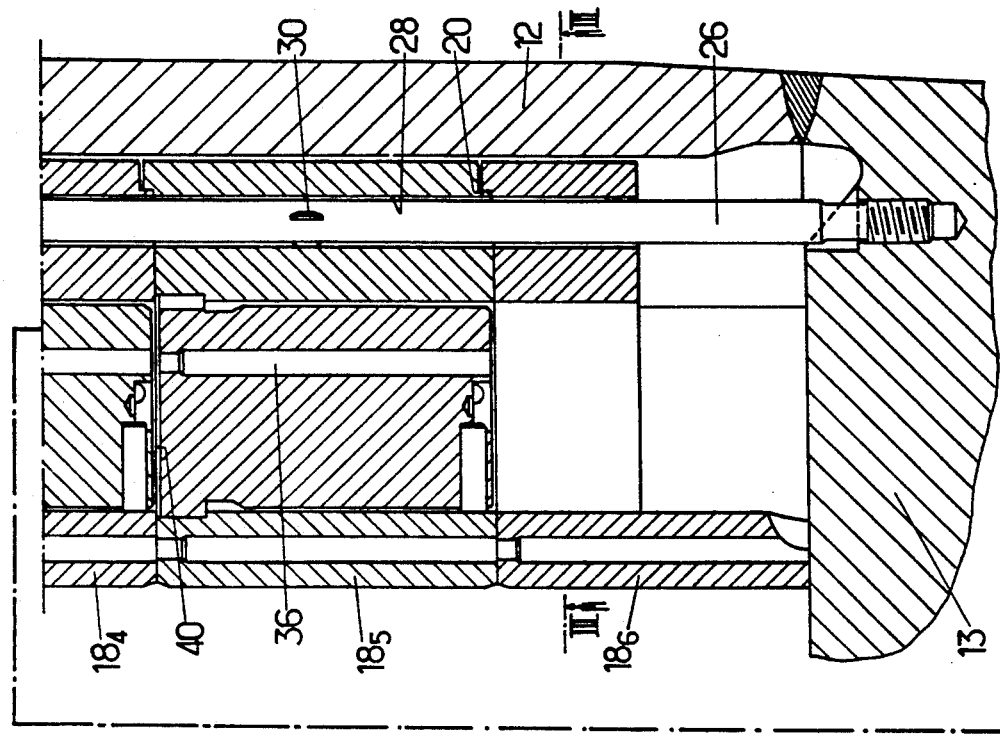
FIG. 1 is a vertical sectional view of a section of a partitioning according to a particular embodiment of the invention.
Figure 1:
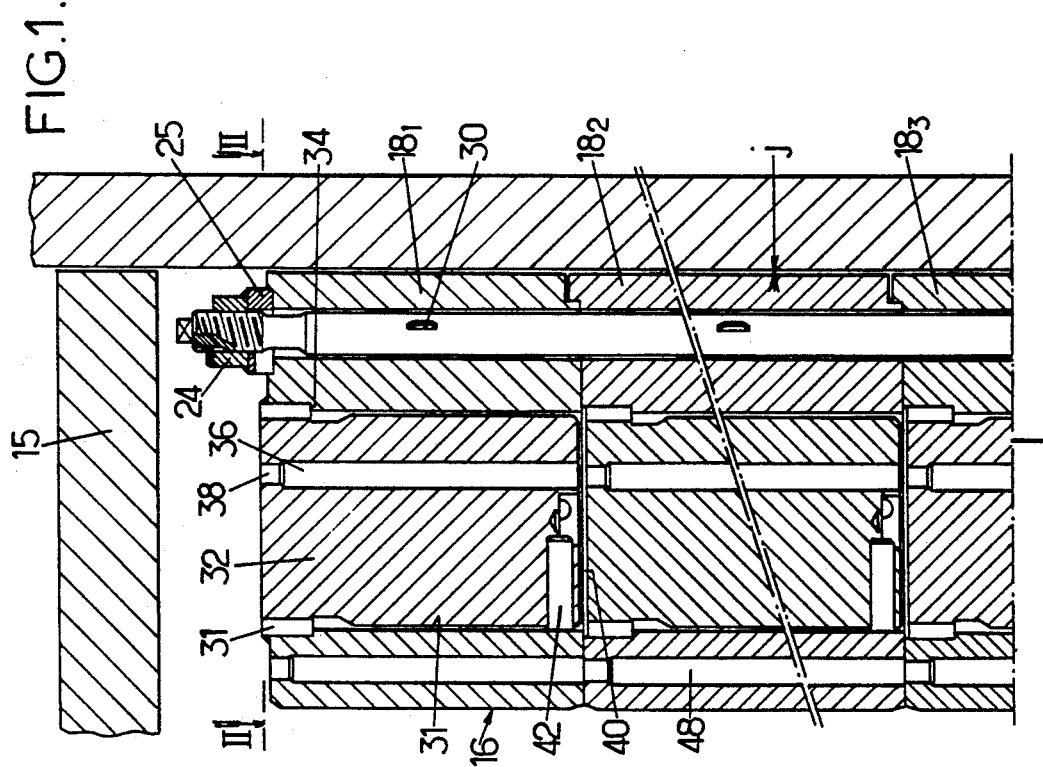

The core partitioning which will now be described may be used in a pressurized water reactor having a general construction comparable to that of the reactor described in U.S. Pat. No. 4,925,624, to which reference may be made. Such a reactor comprises a cylindrical vessel with a cover. A cylindrical casing 12, inside the vessel, defines therewith an annular passage through which water admitted into the vessel flows down to the bottom of the reactor before rising into the core. The core is formed by juxtaposed fuel assemblies resting on a lower core plate 13 and over which a plate 15 is fitted.

The core is formed of juxtaposed assemblies with hexagonal or square cross section. If the assemblies have a square cross-section, the periphery of the core has a cross-section with facets facing two mutually perpendicular directions.

Partitioning 16 occupies substantially the whole volume of the annular space between the external surface of the core and the internal face of the casing 12. It is formed by a stack of rings 18 whose cross-section has an internal periphery matching the external contour of the core and an external periphery which is circular. The initial diameter of the external periphery is chosen so that a clearance j is left between casing 12 and the partitioning. The number of rings forming the partitioning is chosen so that the unit mass of the rings does not exceed available manufacturing and handling possibilities. For a diameter of about 4 m, the partitioning 16 may be formed of five or six rings $18_1$-$18_6$.

The rings are centered and indexed in casing 12 by keys (not shown) which may have the arrangement described in French Patent No. 87 17923 or U.S. Pat. No. 4,925,624 and they leave clearances for cooling water flow.

Centering of the rings with respect to each other may be completed by engaging the rings into each other by giving them an annular flange such as shown at 20 in FIG. 1.

In the embodiment illustrated, vertical posts 21 screwed to the lower core plate 13 pass through aligned passages 28 formed in all rings $18_1$-$18_6$. The diameter of passages 28 is such that a space for cooling water flow exists about the posts. For this space to be even, the posts are advantageously provided with centering fins 30. The keys, the posts 26 and possibly the mutual interengagement of rings $18_1$-$18_6$ guarantee a high positioning accuracy. Nuts 24, locked against rotation after tightening, press washers 25, formed with water passages, on ring $18_1$ and hold the rings applied against each other.

Partitioning 16 has, because of the irregular shape of the periphery of the core, portions which are particularly thick. They are each cooled by water flow in an annular passage formed between plugs 32 and cylindrical holes which receive them, formed in the rings.

In the embodiment shown by way of example in FIG. 1, only rings $18_1$-$18_5$ carry mutually aligned plugs 32. In ring $19_6$ there is formed a water distribution chamber.

Each plug 32 has a flange 31 which rests on a shoulder 34 formed in the respective ring. The flange is machined to deflect the water streams which flow through it and to give a helical movement to the annular layer of cooling water flowing around the plug. As shown the flange comprises a set of substantially helical teeth, of a sufficient depth for communication with the annular space. The water thus flows, from a balancing chamber 40 formed between two successive plugs, through an annular space then through the channels defined by the teeth of the crown. A circumferential slope of about 15° will often give satisfactory results.

To reduce the head losses at the entrance to the channels, the plugs advantageously have a streamlined narrowed portion immediately below the flange.

It is sufficient to give the balancing chambers 40 a height of a few millimeters. The crowns may typically have a thickness of 30 to 40 mm. Annular spaces having a radial thickness of about 3 mm will generally give satisfactory results.

Figure 3:
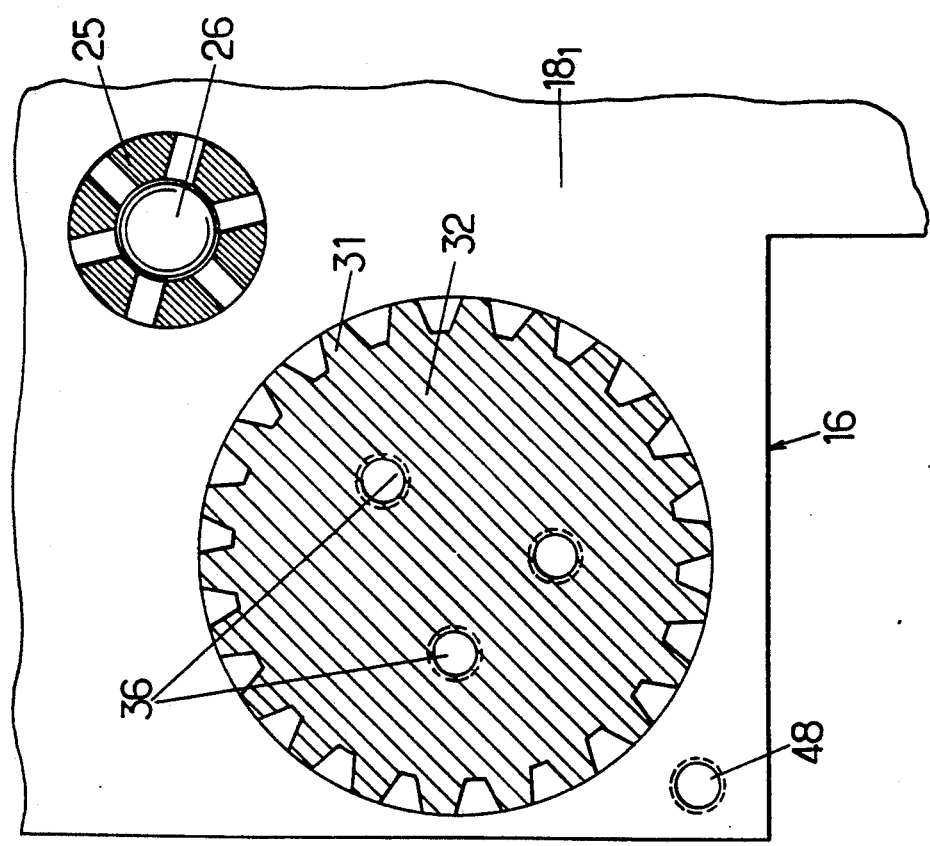

To maintain a regular radial clearance, each plug is advantageously provided at its lower part with centering means. As shown in FIGS. 1 and 3, they are formed by three pins 42 oriented radially and spaced apart at intervals of 120°. The plug is thus centered by the flange at its upper part and by the pins at its lower part. The pins are typically locked, after positioning, by welding beads. The plugs may also be locked by welding beads, after fitting, to avoid any movement.

Figure 2:
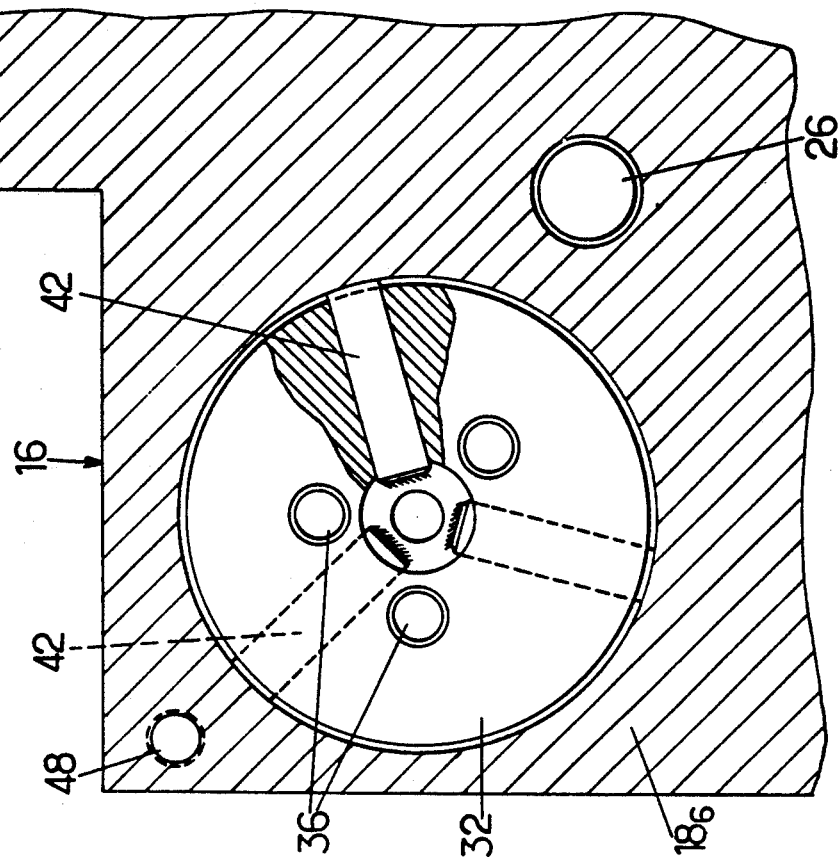
FIG. 2 and 3 are sectional views through lines II—II and III—III, respectively, of FIG. 1.

An additional cooling path may preferably be formed by vertical passages 36 in the plugs; these passages have a restricted zone 38 whose diameter is selected so as to provide a head loss which adjust the flow rate. The axial passages are distributed according to the cooling needs: referring to FIG. 2, the passages are closer together in the vicinity of the frontier with the core.

Additional bores 48 may be formed directly in the rings, in the vicinity of the frontier, so as to complete cooling and homogenize the temperature of the partitioning.

The arrangement which has just been described allows to obtain a mean heating of the water which is of about 10° C. over the total height of the core, in a reactor which can be considered as typical, with small variations depending on the positions, while only deriving about 2% of the total flow rate delivered by the pumps through the partitioning. If there were no helical movement, the temperature of the water on the side closest to the frontier with the core could increase by about 17° over the whole height of the core, whereas it would only increase by 3° C. on the opposite side: the gain of 7° C. obtained on the maximum temperature of the water and so of the partitioning at the hottest point of a ring, for a given cooling water flow rate and a given volume of water in the core, represents an important advantage.

I claim:

1. Pressurized water reactor having a core formed by fuel assemblies of prismatic shape disposed side by side inside a cylindrical casing having a vertical axis; a solid partitioning located in a space reserved between the core and the casing, the partitioning being formed as a vertical stack of rings each completely surrounding the core, whose external periphery is received in the casing and separated therefrom by a clearance and whose internal periphery matches the external contour of the core; and keying means fixed to the casing and projecting into vertical grooves formed in the rings for centering said rings with respect to the core casing, wherein said stack is formed with a plurality of vertical channels each consisting of a plurality of vertical mutually aligned passages each formed in a respective one of said rings, each channel containing a plurality of vertically aligned plugs and each of said plugs being supported by a respective one of said rings, being centered in the passage in the respective ring and defining therewith a restricted water flow passage, some at least of said plugs projecting upwardly above the respective ring into a cavity of the ring placed above said respective ring, and wherein some at least of the plugs comprise a flange bearing on a shoulder of a respective one of said rings, machined for defining channels slanted with respect to the vertical so as to give a circumferential speed component to water flowing along the annular passages.

2. Reactor according to claim 1, wherein each said flange has a set of substantially helical teeth of a sufficient depth to allow communication with the annular space and to form said channels.

3. Reactor according to claim 1, wherein each of said plugs has radial centering pins at the lower part thereof.

4. Reactor according to claim 1, wherein a pressure balancing chamber is formed between the upper face of at least one of the plugs and the lower face of the plug situated above.

5. Reactor according to claim 4, wherein each of the plugs projects above the respective ring and engages into a corresponding cavity of the ring placed immediately above that of the ring on which the plug rests.

6. A pressurized water nuclear reactor having:

a core formed by fuel assemblies of prismatic shape disposed side by side inside a cylindrical casing having a vertical axis;

a solid partitioning located in a space reserved between the core and the casing, the partitioning being formed as a vertical stack of rings each completely surrounding the core, whose external periphery is received in the casing and separated therefrom by a clearance and whose internal periphery matches the external contour of the core; and keying means fixed to the casing and projecting into vertical grooves formed in the rings for centering said rings with respect to the core casing, wherein said stack is formed with a plurality of vertical channels each consisting of a plurality of vertical mutually aligned passages each formed in a respective one of said rings, each channel containing a plurality of vertically aligned plugs, wherein said vertical passages are formed in radially thicker parts only of the rings, wherein each of said plugs cooperate with the respective ring to define an annular water flow channel which includes a serial arrangement of a radial clearance formed between the respective passage and a lower portion of one of said plugs, wherein a pressure balancing chamber is formed between the upper face of one of the plugs and the lower face of the plug situated above, and wherein some at least of the plugs comprise a flange bearing on a shoulder of the respective ring, machined for defining channels slanted with respect to the vertical so as to give a circumferential speed component to water flowing along the annular passages.

* * * * *